(12) United States Patent
Homan et al.

(10) Patent No.: US 6,732,941 B2
(45) Date of Patent: May 11, 2004

(54) AIR CONDITIONER FOR VEHICLE

(75) Inventors: Toshinobu Homan, Obu (JP); Hiroki Nakamura, Chiryu (JP); Tadashi Nakagawa, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/163,061

(22) Filed: Jun. 5, 2002

(65) Prior Publication Data

US 2002/0185546 A1 Dec. 12, 2002

(30) Foreign Application Priority Data

Jun. 8, 2001 (JP) .................................... 2001-173931

(51) Int. Cl.[7] ............................................... B60H 1/02
(52) U.S. Cl. ...................... 237/12.3 B; 165/41; 165/42
(58) Field of Search ...................... 237/12.3 R, 12.3 B; 62/239; 165/41, 42

(56) References Cited

U.S. PATENT DOCUMENTS 5,255,733 A * 10/1993 King ........................ 165/299
6,164,367 A * 12/2000 Kurahashi et al. ............ 165/42
6,196,295 B1 * 3/2001 Durham ...................... 165/42
6,454,180 B2 * 9/2002 Matsunaga et al. ..... 237/12.3 B
6,464,027 B1 * 10/2002 Dage et al. ................ 180/65.2

FOREIGN PATENT DOCUMENTS

JP          10-236145         9/1998

* cited by examiner

*Primary Examiner*—Derek Boles
(74) *Attorney, Agent, or Firm*—Harness, Dickey & Pierce, PLC

(57) ABSTRACT

An air conditioner for a vehicle having a passenger compartment has an electric-powered hot water pump in addition to a mechanical hot water pump driven by an engine mounted on the vehicle. The electric-powered hot water pump is activated while the engine is stopped. However, the electric-powered hot water pump is kept in a non-activation state while an air mix door is positioned in a low temperature side as compared to a predetermined value and an elapsed time after the engine is stopped is within a predetermined time so that power consumption by the electric-powered hot water pump can be decreased suitable for a hybrid vehicle having a driving motor in addition to the engine.

17 Claims, 5 Drawing Sheets

AIR CONDITIONER FOR VEHICLE

CROSS REFERENCE TO RELATED APPLICATION

This application is based upon Japanese Patent Application No. 2001-173931, filed on Jun. 8, 2001, the contents of which are incorporated herein by reference.

BACKGROUND OF THE INVENTION

1. Field of the Invention

The present invention relates to an air conditioner for a vehicle, which has an electric-powered hot water pump as an apparatus for circulating hot water in a heater core for heating, and is especially suitable for actuation control of the electric-powered hot water pump in a hybrid (gas-and-electric powered) vehicle, an economical running vehicle or the like.

2. Related Art

An air conditioner for a hybrid vehicle which is driven by an engine and an electric motor is disclosed in JP-A-10-236145. The air conditioner has a hot water circuit in which hot water (coolant) of the engine is circulated in the heater core by a mechanical hot water pump driven by the engine while the engine is activated, and by an electric-powered hot water pump while the engine is not activated.

Moreover, the air conditioner detects a position of an air mix door for adjusting the ratio between air mass flow (the amount of cool air) passing through a bypass passage of the heater core and air mass flow (the amount of hot air) passing through the heater core. The air conditioner does not heat air by the heater core, and deactivates the electric-powered hot water pump, even if the engine is not activated, when the air mix door is positioned at a maximum cooling position (door opening degree=0) which indicates air mass flow is prohibited from passing through the heater core.

This means, in this conventional air conditioner, the electric-powered hot water pump is always activated when the air mix door is not positioned at the maximum cooling position during non-activation of engine. As a result, electrical power consumption involved in activation of the electric-powered hot water pump increases while the engine is not activated, thereby hastening deterioration of the remaining charge in the battery mounted on the vehicle.

SUMMARY OF THE INVENTION

An object of the invention is to provide an air conditioner for a vehicle that has an electric-powered hot water pump as an apparatus for circulating hot water in a heater core, and that can reduce electric power consumption involved in the actuation of the electric-power hot water pump.

According to an aspect of the present invention, the air conditioner has a controller for controlling the electric-powered hot water pump which determines whether the amount of conserved heat in the heater core satisfies the amount of heat required for heating air. The controller stops the activation of the electric-powered hot water pump when the amount of conserved heat is determined to satisfy the amount of necessary heat. As a result, the electrical power consumption can be reduced when the amount of conserved heat is presumed to satisfy the amount of heat necessary.

According to a second aspect of the present invention, a temperature adjusting means for adjusting the temperature of air blown into a passenger compartment of the vehicle by adjusting the amount of heating of the air heated by the heater core, and a calculating means for calculating a threshold value ($\theta\alpha$) for determining a position of the temperature adjusting means based on information in association with the amount of conserved heart in the heater core are provided. This determines that the amount of conserved heat in the heater core satisfies the amount of heat necessary for heating air when the temperature adjusting means is positioned within a lower-temperature side as compared to the threshold value ($\theta\alpha$) for the operated position of the temperature adjusting means.

With these features, it can be suitably presumed whether the amount of conserved heat in the heater core for heating satisfies the amount of necessary heat for heating air by comparing the threshold value and the operated position of the temperature adjusting means.

Preferably, the calculating means shifts the threshold value to a value at a high temperature side in accordance with an increase of information which relates to the amount of conserved heat in the heater core, so that the amount of conserved heat in the heater core is better determined based on the change in information relating to the amount of conserved heat.

According to another aspect of the present invention, in addition to a mechanical hot water pump driven by the engine of the vehicle while the engine is activated, which circulates hot water in a hot water circuit, an air conditioner for the vehicle has a heater core provided in the hot water circuit for heating air blown out to a passenger compartment of the vehicle, an electric-powered hot water pump for circulating the hot water in the heater core while the engine is not activated, and a calculating means for calculating a non-active time period($t\alpha$) in which the electric-powered hot water pump can be stopped based on information in association with the amount of conserved heat in the heater core for heating when the status of the engine for the vehicle changes from activation to non-activation. In this air conditioner, when the status of the engine of vehicle changes from activation to non-activation, the electric-powered hot water pump is kept non-active during the non-active time period($t\alpha$). After the non-active time period($t\alpha$) has passed, the electric-powered hot water pump is activated.

Thus, even after the engine of the vehicle is stopped, the electric-powered hot water pump is kept non-active during the non-active time period, and therefore, activation time of the electric-powered hot water pump can be shortened. As a result, electrical power consumption by the electric-powered hot water pump can be reduced.

Preferably, the information relating to the amount of conserved heat of the heater core is specifically the temperature of the heater core.

Preferably, the temperature of the heater core can be determined based on the temperature of air sucked into the heater core, the temperature of the hot water and the air mass flow of the air.

According to another aspect of the present invention, in addition to a mechanical hot water pump driven by the engine of the vehicle while the engine is activated, which circulates hot water in a hot water circuit, an air conditioner for the vehicle has a heater core provided in the hot water circuit for heating air blown out to a passenger compartment of the vehicle, an electric-powered hot water pump for circulating the hot water in the heater core while the engine is not activated, and a temperature adjusting means for adjusting the temperature of air blown into a passenger compartment of the vehicle by adjusting the amount of heating of air heated by the heater core. In this air conditioner, the electric-powered hot water pump is kept non-active in a situation where the temperature adjusting means is positioned in a low-temperature side in comparison with a predetermined value($\theta1$), and the lapsed time(t) is within a predetermined time(t1), after the status of the engine of vehicle changes from activation to non-activation. Also, the electric-powered hot water pump is activated in a situation where the temperature adjusting means is positioned in a high-temperature side in comparison with the predetermined value($\theta1$), and the lapsed time(t) exceeds the predetermined time(t1), after status of the engine of vehicle changes from activation to non-activation.

Thus, the electric-powered hot water pump can be kept non-active by determining a situation where the amount of conserved heat of the heater core satisfies the amount of heat necessary based on the operated position of the temperature adjusting means and the lapsed time(t) after the engine of the vehicle is stopped. Therefore, activation time of the electric-powered hot water pump can be shortened. As a result, electrical power consumption by the electric-powered hot water pump can be reduced.

Preferably, the predetermined value($\theta1$) is shifted to the high temperature side according to the increase of temperature of air sucked into the heater core, so as to appropriately set the predetermined value($\theta1$) according to the change in the temperature of the sucked air.

Preferably, the predetermined time(t1) is lengthened in accordance with the increase of temperature of air sucked into the heater core for heating, so as to appropriately set the predetermined time (t1) according to the change in the temperature of the sucked air.

Preferably, the air conditioner further comprises an inside/outside air switching door for switching air-suction openings between inside and outside, and determines the temperature of the sucked air based on an operated position of the inside/outside air switching door, the temperature of inside air and the temperature of outside air.

Preferably, the predetermined time(t1) is lengthened in accordance with the increase of temperature of hot water at the time when the status of the engine changes from activation to non-activation, so as to appropriately set the predetermined time(t1) according to the change in the temperature of the hot water.

Other features and advantages of the present invention will become more apparent from the following detailed description made with reference to the accompanying drawings.

DETAILED DESCRIPTION OF THE PREFERRED EMBODIMENT

Figure 1:
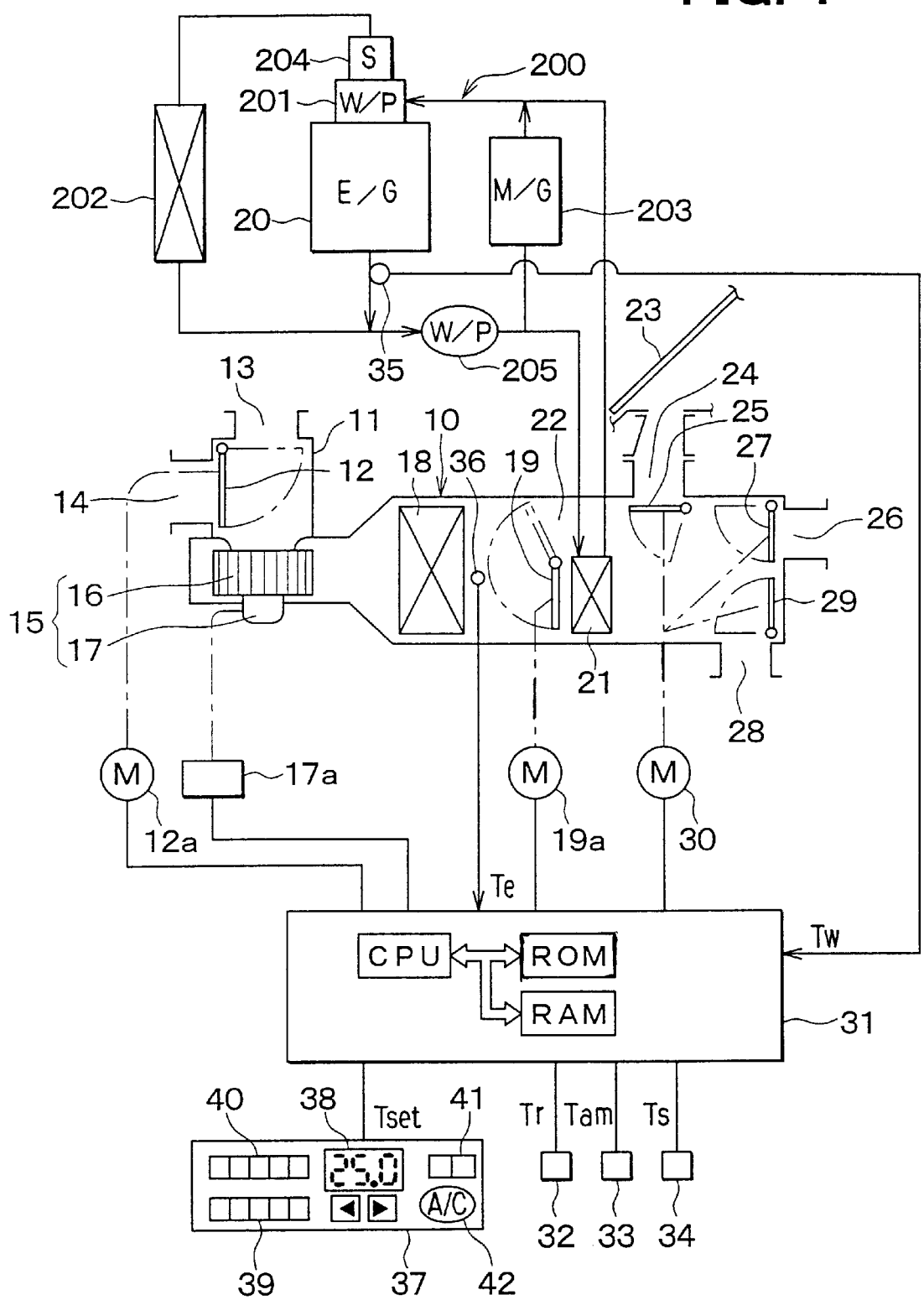
FIG. 1 is a view illustrating an entire construction of a ventilation system according to the present invention.

Specific embodiments of the present invention will now be described hereinafter with reference to the accompanying drawings in which the same or similar component parts are designated by the same or similar reference numerals.

(First Embodiment)

First, a schematic ventilation system in which air is blown toward a passenger compartment of a vehicle will be described with reference to FIG. 1. An air conditioning case 10 defines an air passage for the air blown toward the passenger compartment. An inside/outside air switching box 11 is provided at the most upstream end of the air conditioning case 10.

The inside/outside air switching box 11 has an inside/outside switching door 12 inside thereof to open and close an inside air inlet 14 for introducing inside air (air of the passenger compartment) into the inside/outside air switching box 11 and an outside air inlet 13 for introducing outside air (air of the outside of the vehicle) into the inside/outside air switching box 11. The inside/outside switching door 12 is driven by an electric-drive apparatus 12a such as a servomotor.

An air blower unit 15 is provided at a downstream side of the inside/outside air switching box 11 in the air conditioning case 10, for blowing air to the passenger compartment through the air conditioning case 10. The air blower unit 15 has a centrifugal blower fan 16 and a driving motor 17. A motor driving circuit 17a adjusts supply voltage (blower voltage) so as to control a revolution rate of the blower fan 16.

An evaporator 18 comprising a part of a cooling heat exchanger is provided at a downstream side of the air blower unit 15 in the air conditioning case 10. As well known, the evaporator 18 cools air by causing evaporation of low-pressure coolant decompressed by a decompression means in a refrigeration cycle by absorbing heat from the air coming into the air conditioning case 10. An air mix door 19 is provided at a downstream side of the evaporator 18.

A heater core 21 (heating heat exchanger), which heats air using hot water (cooling water) flowing in an engine 20 as a heat source, is provided at a downstream side of the air mix door 19. A bypass passage 22 is formed next to the heater core 21 so that air can bypass the heater core 21.

The air mix door 19 is a rotatable plate-like door driven by an electrical drive apparatus comprised of a servomotor 19a. The air mix door 19 is for adjusting the ratio between the amount of heated air passing through the heater core 21 and the amount of cooled air passing through the bypass passage 22, thereby adjusting the temperature of the air blown into the passenger compartment.

Namely, the heated air passing through the heater core 21 and the cooled air passing through the bypass passage 22 are mixed with each other so as to make air having a temperature indicated by a user. Therefore, the air mix door constitutes a temperature adjusting means for the air blown into the passenger compartment in this embodiment.

At the most downstream end of the ventilation passage in the air conditioning case 10, a blowing mode switching portion is provided. More specifically, a defroster opening portion 24 is formed at an upper side of the air conditioning case 10 to blow out the conditioned air to a windshield of the vehicle, and it is opened and closed with a rotatable plate-like defroster door 25. Also, at a side of the air conditioning case 10 and at a rear side of the vehicle as compared to a position of the defroster opening portion 24, a face opening portion 26 is formed so as to blow out the conditioned air to an upper body of a passenger in the vehicle, and it is opened and closed by a rotatable plate-like face door 27. Moreover, a foot opening portion 28 is formed at a lower side of the air conditioning case 10 as compared to the face opening 26 to blow out the conditioned air to the feet of the passenger in the vehicle, and it is opened and closed by a rotatable plate-like foot door 29. These blowing mode doors 25, 27 and 29 are connected with each other by a common link system (not shown), and driven by an electric drive apparatus comprised of a servomotor through the link system.

Next, a hot water circuit 200 of an engine 20 in a hybrid vehicle will be described. The vehicle engine 20 constitutes a driving source for traveling of the hybrid vehicle with an electric motor for traveling. A mechanical hot water pump 201 is driven by the vehicle engine 20, whereby hot water (engine cooling water) circulates in the hot water circuit 200. A radiator 202, a motor generator 203 and the heater core 21 are connected to the hot water circuit 200 in parallel.

The motor generator 203 works as a generator when rotated by the vehicle engine 20 after the vehicle engine is activated as well as an engine starter for the vehicle engine 20. By circulating the hot water (engine cooling water) to the motor generator 203, cooling of the motor generator 20 is achieved as well as increasing of the heating source by withdrawing radiated heat from the motor generator 203.

A thermostat 204 is, as it well known, a temperature-responsive valve that prevents the hot water from circulating to the radiator 202 when the temperature of the hot water is low so that the temperature of the hot water rises easily. An electrical hot water pump 205 is activated by being supplied electricity from a battery in the car while the vehicle engine 20 (mechanical hot water pump 201) is non-active so as to circulate the hot water to the motor generator 203 and the heater core 21.

Next, an electric control portion of this embodiment will be described schematically. An air conditioning control device 31 has a well known microcomputer including CPU, ROM, RAM, and other circuit portions. Sensor signals from a group of sensors 32 to 36 and operated signals from operating switches are input to the air conditioning control device 31.

The group of sensors 32 to 36 comprises well known sensors that detect the temperature of inside air of the vehicle passenger compartment (Tr), the temperature of outside air of the vehicle passenger compartment (Tam), the amount of sunlight (Ts), the temperature of the hot water (Tw) and the temperature of air blowing from evaporator (Te) which denotes the temperature of the air immediately after passing through the evaporator. A water temperature sensor 35 for detecting the temperature of the hot water is positioned at a hot water outlet of the vehicle engine 20 in the hot water circuit 200. An evaporator air temperature sensor 36 is positioned at a location of the air conditioning case 10 where the air has just pass through the evaporator 9.

An air conditioning control panel 37 is in the vicinity of indicators in the vehicle passenger compartment. Operational switches 38 to 42 are manually operated by the passenger. For example, a temperature determination switch 38 is for generating a temperature determination signal. An air flow control switch 39 is for generating an air flow switching signal. A blowing mode switch 40 is for generating a blowing mode signal. An inside/outside-air selecting switch 41 is for generating an inside/outside-air selecting signal. An air conditioning switch 42 is for generating an on/off signal for the compressor for ventilation.

Figure 2:
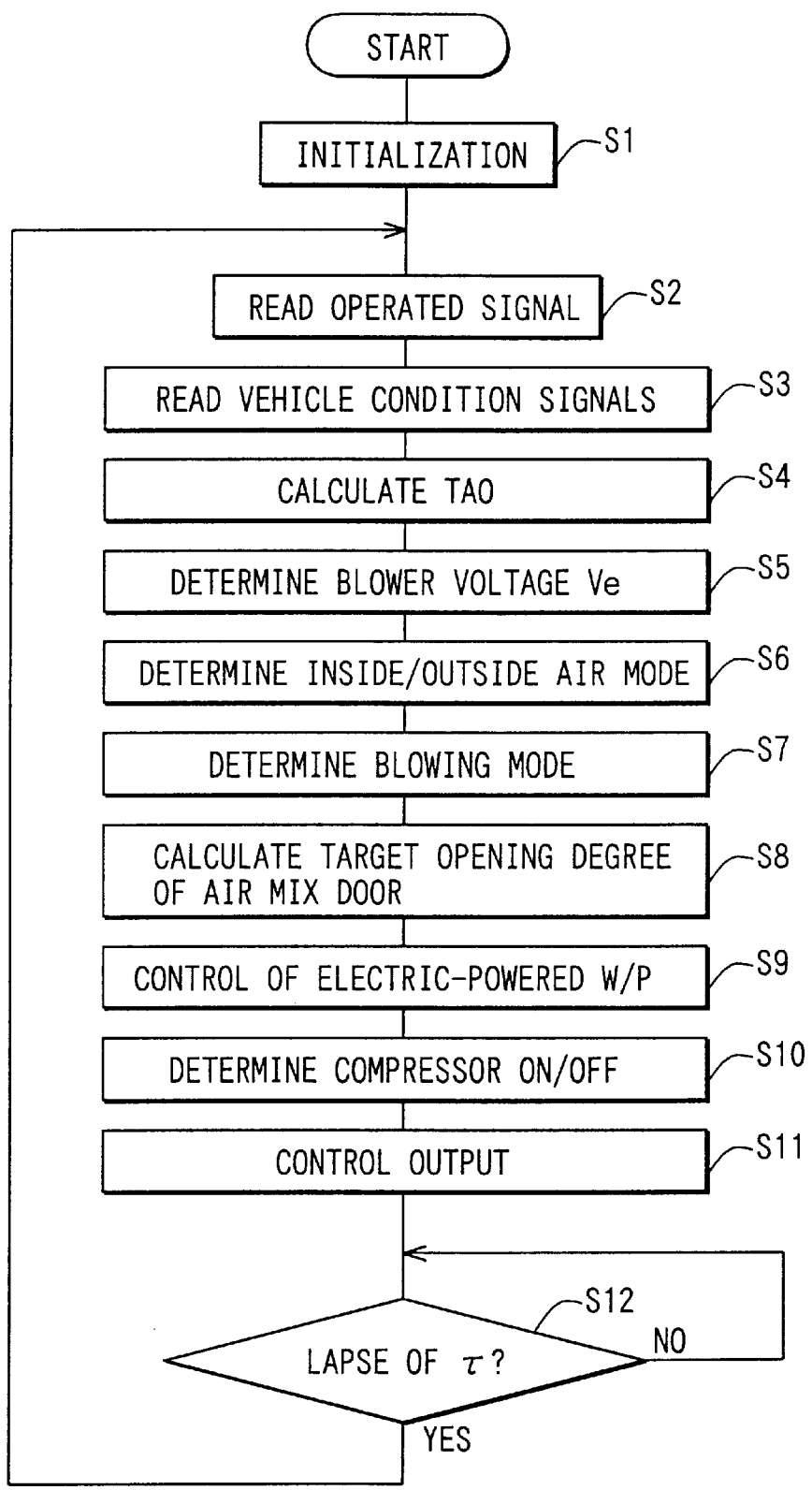
FIG. 2 is a flow chart showing a schematic ventilation control of a first embodiment of the present invention.

Next, an operation of the above-described system in this embodiment will be described. A flow chart in FIG. 2 shows a schematic control process executed by the microcomputer in the air conditioning control device 31. The control routine in FIG. 2 is started when the control device 31 is supplied power after an ignition switch is turned on.

First, a flag and a timer are initialized in step S1. Next, the microcomputer inputs the operational signals from the operational switches 38 to 42 and the like in the air conditioning control panel 37 in step S2. Next, the microcomputer inputs detected signals indicative of environmental conditions of the vehicle from the sensors 32 to 36 in step S3.

Subsequently, a target blowing temperature (TAO) of the air blown into the passenger compartment is calculated in step 4. This target blowing temperature (TAO) is a blowing temperature for keeping the passenger compartment at a set temperature (Tset) set by the operational switch 38, and determined by the following equation (1).

$$TAO = Kset \times Tset - Kr \times Tr - Kam \times Tam - Ks \times Ts + C \quad (1)$$

Wherein Tr represents an inside air temperature detected by an inside air temperature sensor 32, Tam represents an outside air temperature detected by an outside air temperature sensor 33, Ts represents a sunlight amount detected by a sunlight sensor 34. Kset, Kr, Kam and Ks represent gains, and C represents a correction constant.

Next, in step S5, a blower voltage (Ve) corresponding to the voltage applied to the blower driving motor 17 is determined according to the above-described TAO as a target blowing air amount blown by the air blower unit. This determination of the blower voltage (Ve) is well known. Schematically, the blower voltage (Ve) is increased at a high temperature side (maximum heat side) and a low temperature side (maximum cool side) of the TAO, and decreased at an intermediate temperature region of the TAO.

Next, the inside/outside air mode is determined at step S6. This mode is, for example, changed step by step from an all inside air mode, an inside/outside air mix mode and an all outside air mode while the TAO is increased from the low temperature side to the high temperature side. The inside air mode may be selected when the inside air temperature (Tr) is higher by a predetermined temperature or more than the set temperature (Tset), that is, in a high load condition for cooling, and the outside air mode may be selected in predetermined conditions other than the high load condition for cooling. Also, the inside/outside air mode is determined by a manual setting when the inside/outside air mode is set as the manual setting by the inside/outside-air selecting switch 41.

Next, a blowing-out mode is selected according to the TAO described above in step S7. As it well known, the blowing-out mode is changed step by step from a face mode, bi-level mode and foot mode according to the increase of the TAO from the low temperature side to the high temperature side. Also, the blowing-out mode is determined by a manual setting when the blowing-out mode is set as the manual setting by the blowing mode switch 40.

Next, a target opening degree (SW) of the air mix door 19 is calculated according to the following equation (2) based on the TAO described above, the temperature of air blowing from evaporator (Te) and the temperature of the hot water (Tw).

$$SW = ((TAO - Te)/(Tw - Te)) \times 100(\%) \quad (2)$$

The target opening degree (SW) of the air mix door 19 is indicated by a percentage in which a maximum cool position of the air mix door 19 represents 0% as shown in a solid line in FIG. 1, and a maximum heat position of the air mix door 19 represents 100% as shown in a one-dotted solid line in FIG. 1.

Next, activation control of the electric-powered hot water pump 205 is performed in step S9. This step S9 will be detailed with reference to FIG. 3 later.

Next, an intermittent on/off state of the compressor is determined at step S10. Namely, the intermittent on/off state of the compressor is determined according to an applied voltage to an electromagnetic clutch of the compressor by comparing a target evaporator temperature (TEO) and the temperature of air blowing from evaporator (Te).

Next, control signals are input to the all of actuators (12a, 17, 19a, 30, 205) so that a predetermined condition determined at the steps S5 to S10 described above in step S11. Finally, the control routine is returned to the step S2 when it is detected that a control period (τ) has passed.

Figure 3:
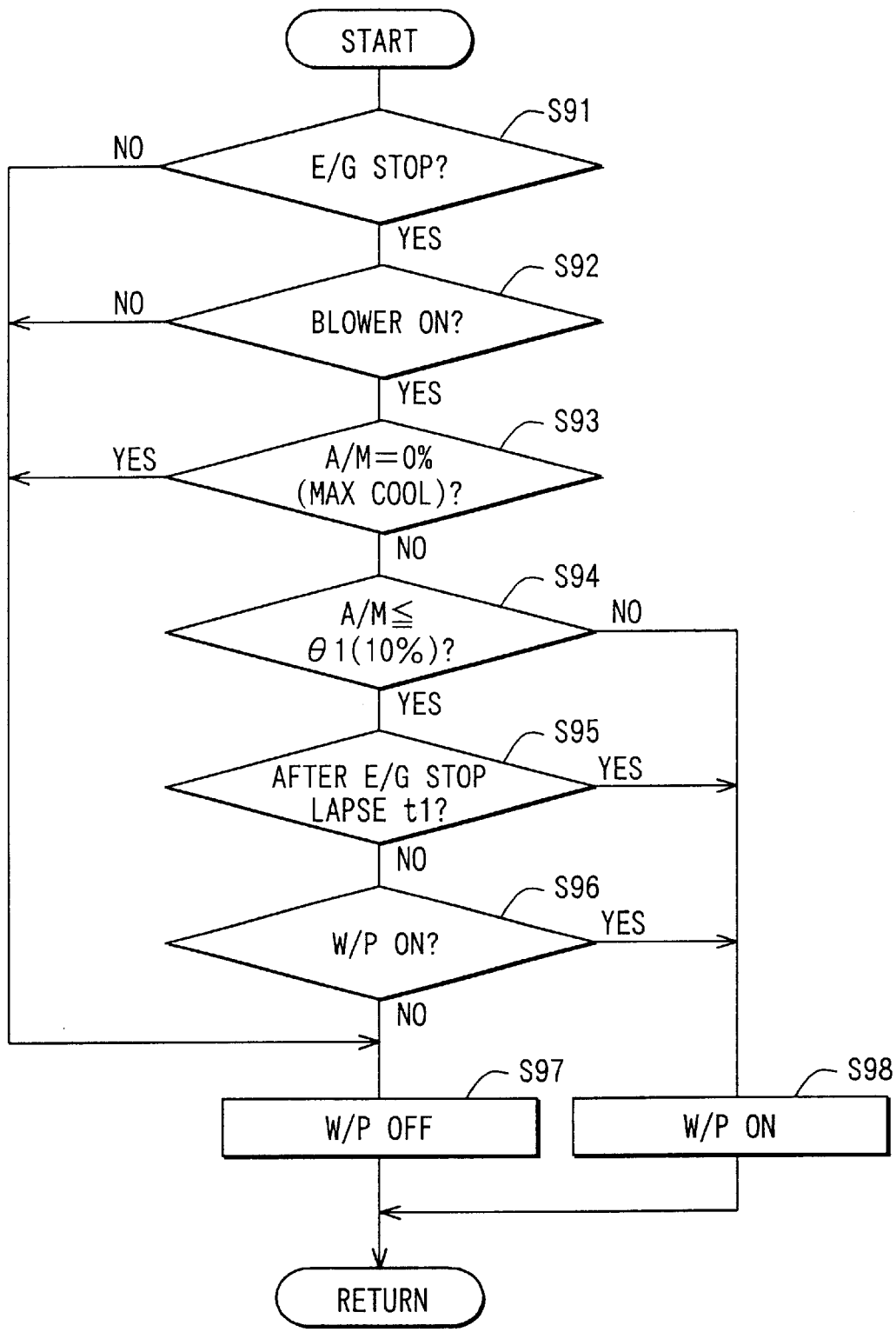
FIG. 3 is a flow chart showing an activation control of an electric-powered hot water pump of the first embodiment of the present invention.

Hereinafter, activation control of the electric-powered hot water pump 205 in the step S9 will be described with reference to FIG. 3. First, it is determined whether or not the vehicle engine 20 is stopped at step S91. The flow will continue to step S97 to stop the electric-powered hot water pump 205 while the vehicle engine 20 is operated since the mechanical hot water pump 201 is operated. The flow will continue to step S92 to determine whether or not the air blower unit 15 is activated while the vehicle engine 20 is not activated. Accordingly, the electric-powered hot water pump 205 is not activated in step S97 since it is not necessary to circulate the hot water to the heater core 21 while the air blower unit 15 is not activated, i.e., the ventilation system is not activated.

Meanwhile, the flow continues to step S93 to determine whether or not the opening degree of the air mix door 19 is at 0% (maximum cool position) when the air blower unit 15 is activated. This determination can be estimated according to the target opening degree (SW) calculated at step S8. Also, this determination at step S93 may be determined according to an actual opening degree of the air mix door 19 detected by a position detecting means such as a potentiometer.

When the opening degree of the air mix door 19 is at 0% (maximum cool position), air passages in the heater core 21 are closed by the air mix door 19. It is not necessary to circulate the hot water to the heater core 21 since the air in the air conditioning case 10 does not pass through the heater core 21. Therefore, in this step, the flow continues to step S97 to stop the electric-powered pump 205.

On the other hand, when the opening degree of the air mix door 19 is not at 0% (maximum cool position), then the flow continues to step S94 to determine whether or not the opening degree of the air mix door 19 is a predetermined value (θ1) or less, which is a small opening degree close to the maximum cool position (ex. 10%). Namely, it is determined whether or not a controlled temperature condition of the air blown into the passenger compartment is close to a maximum cooling condition, in other words, the heating amount of air heated by the heater core 21 is small in this step.

When the opening degree of the air mix door 19 is larger than the predetermined small opening degree (θ1), it means that heating of air by the heater core 21 is required to control the temperature of the air blown into the passenger compartment. Therefore, the flow continues to step S98 to activate the electric-powered hot water pump 205. Thus, the hot water can be circulated in the heater core 21 by the electric-powered hot water pump 205 even when the vehicle engine 20 (mechanical hot water pump 201) is not activated.

Meanwhile, when the opening degree of the air mix door 19 is the predetermined small opening degree (θ1) or less, the flow continues to step S95 to determine whether or not a predetermined time t1 (ex. 20 seconds) as an elapsed time (t) has passed after the vehicle engine 20 is stopped. When the elapsed time (t) is within the predetermined time t1, the microcomputer determines that the heat conserved in the heater core 21 satisfies the amount of heat necessary for heating the air blown into the passenger compartment.

Therefore, when "NO" is determined at step S95, the flow continues to the next step S96 to determine whether or not the electric-powered hot water pump 205 is activated. The electric-powered hot water pump 205 is necessarily in a non-activated state at the time immediately after the vehicle engine 20 is stopped, thereby resulting in that the determination at step S96 becomes "NO". As a result, the flow continues to step S97 to keep non-activation of the electric-powered hot water pump 205.

On the other hand, when the predetermined time t1 passed after the vehicle engine 20 is stopped, the determination at the step S95 becomes "YES", and therefore, the flow continues to the step S98 to activate the electric-powered hot water pump 205. Namely, the heat conserved in the heater core 21 decreases when the predetermined time t1 passed after the vehicle engine 20 is stopped. As a result, the microcomputer determines that the condition of the heater core 21 has changed to a condition in which the heat conserved in the heater core 21 cannot satisfy the amount of heat necessary for heating the air blown into the passenger compartment, and it resumes the circulation of the hot water in the heater core 21 by activating the electric-powered hot water pump 205.

In a situation where the opening degree of the air mix door 19 is increased so as to exceed the predetermined opening degree (θ1) when the elapsed time (t) is within the predetermined time t1, the flow continues from step S94 to step S98 to activate the electric-powered hot water pump 205. After that, even though the opening degree of the air mix door 19 becomes the predetermined opening degree (θ1) or less again when the elapsed time (t) is within the predetermined time t1, the electric-powered hot water pump 205 is kept being activated since the determination at step S96 becomes "YES". Namely, by providing step S96, frequent alternation of an on-state and an off-state of the electric-powered hot water pump 205 is prevented when the elapsed time (t) is within the predetermined time t1.

As described above, in the first embodiment, the electric-powered hot water pump 205 is prohibited from being activated immediately after the vehicle engine 20 is stopped. Also, the electric-powered hot water pump is kept being non-activated while it is determined that the heat conserved in the heater core 21 satisfies the amount of heat necessary for heating the air blown into the passenger compartment. Moreover, the electric-powered hot water pump 205 is allowed to be activated just after it is presumed that the heat conserved in the heater core 21 has become lower than the amount of heat necessary for heating the air blown into the passenger compartment.

Thus, activation time of the electric-powered hot water pump 205 in a non-activation state of the vehicle engine 20 can be minimized so that an electric power consumption by the electric-powered hot water pump 205 can be reduced. Accordingly, decrease of the charge remaining in the battery of the vehicle is prevented from being decreased, thereby reducing running time and running frequency of the vehicle engine for charging the battery of the vehicle.

Moreover, a durable lifetime of the electric-powered hot water pump 205 can be improved by reducing an activation time of the electric-powered hot water pump 205, and activation noise of the electric-powered hot water pump 205 can be reduced.

Although it is determined whether or not the opening degree of the air mix door 19 is the predetermined value (θ1, ex. 10%) or less, the predetermined value (θ1) is not necessarily a constant value, but can be varied according to the temperature of air flowing into the heater core 21.

Namely, since the amount of heat necessary for heating the air blown into the passenger compartment is reduced as the temperature of air flowing into the heater core 21 rises, non-activation time of the electric-powered hot water pump 205 can be lengthened when the predetermined value (θ1) is varied so as to be increased in accordance with an increase of the temperature of air flowing into the heater core 21.

Although it is determined whether or not the predetermined time t1 (ex. 20 seconds) as the elapsed time (t) has passed after the vehicle engine 20 is stopped, the predetermined time t1 is not necessarily a constant value, but can be varied according to the temperature of air flowing into the heater core 21.

Namely, since the amount of heat necessary for heating the air blown into the passenger compartment is reduced as the temperature of air flowing into the heater core 21 rises, non-activation time of the electric-powered hot water pump 205 can be lengthened when the predetermined time t1 is varied so as to be increased in accordance with an increase of the temperature of air flowing into the heater core 21.

Moreover, both of the predetermined value (θ1) for determining the opening degree of the air mix door 19 and the predetermined time t1 for determining the elapsed time (t) after the engine is stopped can be varied according to the temperature of air flowing into the heater core 21.

Although the temperature of the air flowing into the heater core 21 can be directly detected by a temperature sensor, the temperature of the air flowing into the heater core 21 can be estimated according to the temperature of air introduced into the inside/outside-air switching box 11 calculated based on a position of the inside/outside-air switching door 12, the inside air temperature (Tr) and the outside air temperature (Tam), since the temperature of the air flowing into the heater core 21 has a relation to the temperature of air introduced into the inside/outside-air switching box 11.

Furthermore, the predetermined time t1 in step S95 is not necessarily a constant value, but can be varied according to the temperature of the hot water (Tw) at the time when the vehicle engine 20 is stopped.

Namely, since the conserved heat (afterheat) in the heater core 21 becomes large when the temperature of the hot water (Tw) at the time when the vehicle engine 20 is stopped is high, non-activation time of the electric-powered hot water pump 205 can be lengthened when the predetermined time t1 is varied so as to increase when the temperature of the hot water (Tw) at the time when the vehicle engine 20 is stopped is high.

(Second Embodiment)

Figure 4:
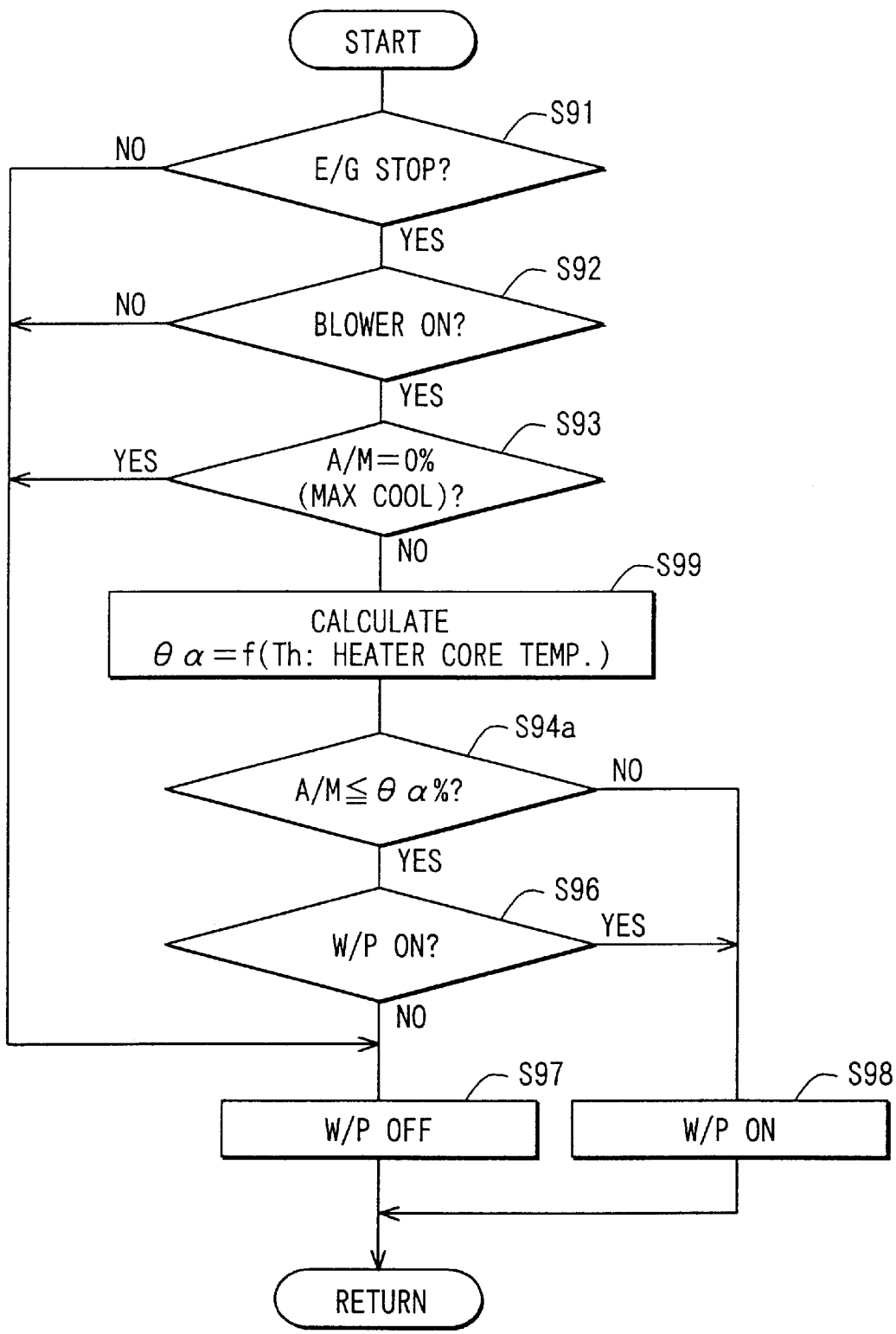
FIG. 4 is a flow chart showing an activation control of an electric-powered hot water pump of a second embodiment of the present invention.

An activation control of the electric-powered hot water pump 205 will be described with reference to FIG. 4 in a second embodiment. Steps S99 and S94a are different than the first embodiment.

In the second embodiment, when it is determined that the opening degree of the air mix door 19 is not 0% (maximum cool position) in step S93 in the non-activation state of the vehicle engine 20, the flow continues to step S99 to calculate a threshold value (θα) for determining the opening degree of the air mix door 19. The threshold value (θα) is calculated as a function of the temperature of the heater core 21 (Th), more specifically, a function of the surface temperature of the heater core 21 (Th). Since the conserved heat (afterheat) in the heater core 21 becomes large as the temperature of the heater core 21 (Th) becomes high, the threshold value (θα) is calculated so as to become large as the temperature (Th) becomes high.

Next, it is determined whether or not the opening degree of the air mix door 19 after the engine is stopped is the threshold value (θα) or less in step S94a. When the determination in this step is "YES", it can be presumed that the heat conserved in the heater core 21 (afterheat) satisfies the amount heat necessary for heating the air blown into the passenger compartment. Therefore, the flow continues from step S94a to step S97 through step S96 to keep the electric-powered hot water pump 205 stopped.

While the electric-powered hot water pump 205 is kept stopped, the temperature of the heater core 21 (Th) drops gradually, whereby the threshold value (θα) is decreased. Also, the opening degree of the air mix door 19 increases in accordance with the drop of the temperature of the hot water (Tw). Therefore, the determination at step S94s becomes "NO" after a while. Namely, it can be determined that the heat conserved in the heater core 21 cannot satisfy the amount of heat necessary for heating the air blown into the passenger compartment based on the determination at the step S94a. Thus, the flow continues to step S98 to activate the electric-powered hot water pump 205.

As described above, according to the second embodiment, since the threshold value (θα) for determining the opening degree of the air mix door is determined according to the temperature of the heater core (Th) after the engine is stopped, the electric-powered hot water pump 205 can be controlled similar to the first embodiment even if the determination of the elapsed time after the engine is stopped described in the first embodiment is not performed.

(Third Embodiment)

Figure 5:
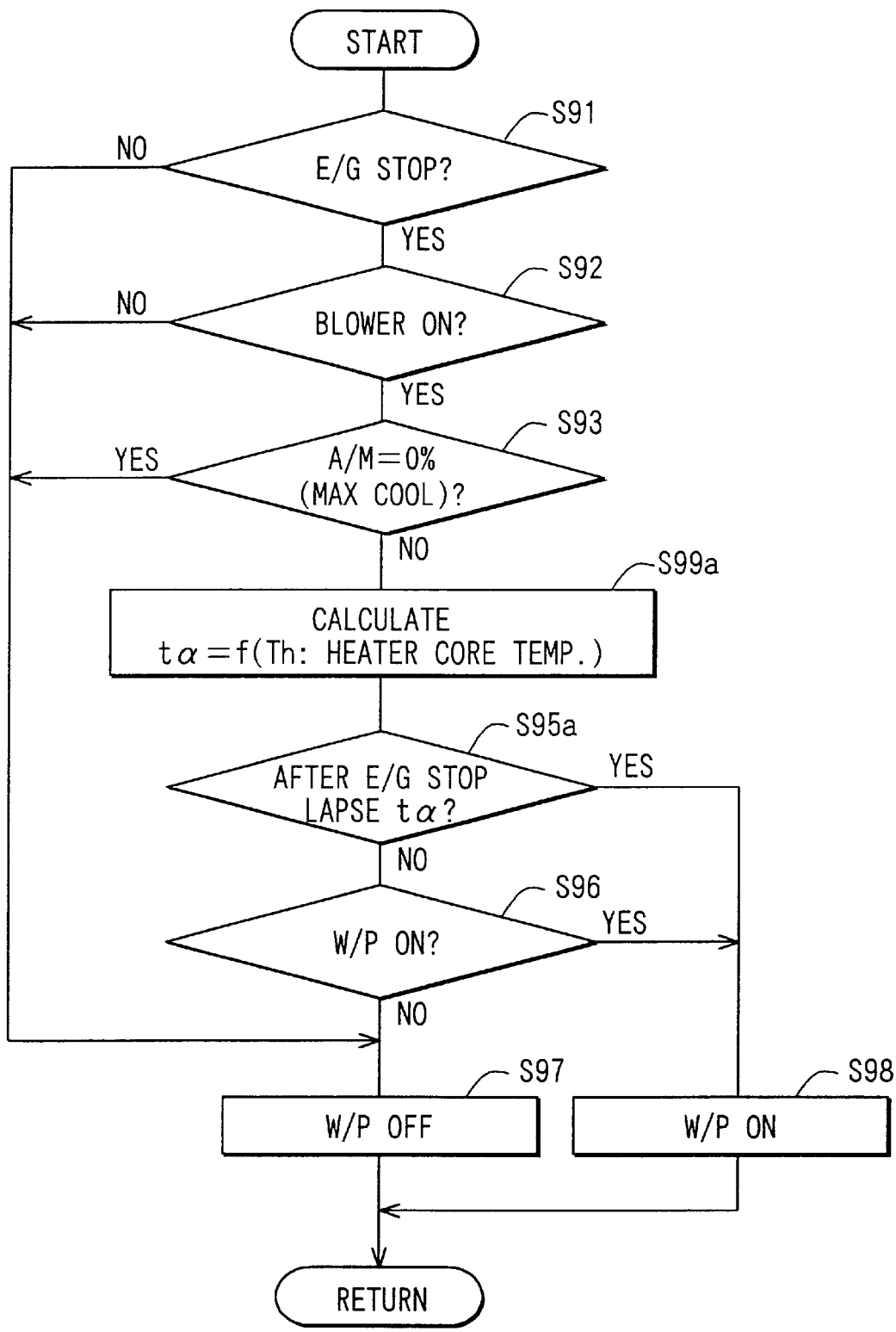
FIG. 5 is a flow chart showing an activation control of an electric-powered hot water pump of a third embodiment of the present invention.

An activation control of the electric-powered hot water pump 205 will be described with reference to FIG. 5 in a third embodiment. Steps S99a and S95a are different than the first embodiment.

In the third embodiment, a threshold value (tα) for determining the elapsed time (t) after the engine is stopped is calculated when the engine is stopped in step S99a. The threshold value (tα) is calculated as a function of the temperature of the heater core 21 (Th), more specifically, a function of the surface temperature of the heater core 21 (Th). Since the conserved heat (afterheat) in the heater core 21 becomes large as the temperature of the heater core 21 (Th) becomes high, the threshold value (tα) is calculated so as to become large as the temperature (Th) becomes high.

Next, it is determined whether or not the elapsed time (t) after the engine is stopped exceeds the threshold value (tα) in the step S95a. When the elapsed time (t) does not exceed the threshold value (tα) (the determination is "NO"), it can be presumed that the heat conserved in the heater core 21 (afterheat) satisfies the amount of heat necessary for heating the air blown into the passenger compartment. Therefore, the flow continues from step S95a to step S97 through step S96 to keep the electric-powered hot water pump 205 stopped.

Then, when the elapsed time (t) exceeds the threshold value (tα), it can be determined that only the heat conserved in the heater core 21 cannot satisfy the amount of heat necessary for heating the air blown into the passenger compartment because the temperature of the heater core 21 (Th) drops. Thus, the flow continues to the step S98 to activate the electric-powered hot water pump 205.

As described above, according to the third embodiment, since the threshold value (tα) for determining the elapsed time (t) after the engine is stopped is determined according to the temperature of the heater core (Th) after the engine is stopped, the electric-powered hot water pump 205 can be controlled similar to the first embodiment even if the determination of the opening degree of the air mix door after the engine is stopped described in the first embodiment is not performed.

In the second or third embodiment, although the temperature detection sensor may be provided to detect the temperature of the heater core (Th) directly, the temperature of the heater core (Th) can be estimated according to the temperature of the hot water (Tw), the temperature of the air flowing into the heater core 21 and the air mass flow at the time when the vehicle engine 20 is stopped. Here, the air mass flow can be calculated by the blower voltage (Ve) that is calculated at step S5 shown in FIG. 2.

In each embodiment above described, although the ratio between the cool air passing through the bypass passage 22 and the hot air passing through the heater core 21 is adjusted by the air mix door 19 so as to adjust the temperature of the air blown into the passenger compartment, the adjustment of the temperature of the air blown into the passenger compartment can be achieved by providing a hot water valve for adjusting the hot water mass flow or the temperature of the hot water. Namely, the present invention is not limited to a particular type with respect to the way for adjusting the temperature of the air blown into the passenger compartment.

In each embodiment above described, although both of the mechanical hot water pump 201 driven by the engine and the electric-powered hot water pump 205 are changed from one to another for circulating the hot water in the heater core 21, the present invention can be applied to a system having only the electric-powered hot water pump 205 for circulating the hot water without the mechanical hot water pump. That is, the electric-powered hot water pump 205 can be activated intermittently by determining a period for stopping the electric-powered hot water pump 205 based on the idea of the present invention.

Furthermore, the present invention is not limited to the hybrid vehicle, but can be applied to a ventilation system of an economical running vehicle.

While the present invention has been shown and described with reference to the foregoing preferred embodiment, it will be apparent to those skilled in the art that changes in form and detail may be therein without departing from the scope of the invention as defined in the appended claims.

What is claimed is:

1. An air conditioner for a vehicle having a passenger compartment, comprising:
   a heater core for heating air blown into the passenger compartment, the heater core being provided in an air conditioning case in which the air passes;
   an electric-powered hot water pump for circulating hot water to said heater core; and
   a controller for controlling the electric-powered hot water pump, and for determining whether a conserved heat amount in the heater core satisfies an amount of heat necessary for heating the air passing through the air conditioning case, wherein:
      when the controller determines that the conserved heat amount in the heater core satisfies the amount of heat necessary for heating the air, said controller stops the electric-powered hot water pump.

2. An air conditioner for a vehicle according to claim 1, further comprising:
   a temperature adjusting means for adjusting a temperature of the air blown into the passenger compartment by adjusting a heating amount of the air heated by the heater core; and
   a calculating means for calculating a threshold value for determining an operated position of the temperature adjusting means according to information relating to the conserved heat amount in the heater core, wherein:
      the controller presumes that the conserved heat amount in the heater core satisfies the amount of heat necessary for heating the air when the operated position of the temperature adjusting means is positioned in a low temperature region as compared to the threshold value.

3. An air conditioner for a vehicle according to claim 2, wherein said calculating means shifts the threshold value to a high temperature side value in accordance with an increase in the information relating to the conserved heat amount in the heater core.

4. An air conditioner for a vehicle according to claim 2, wherein the information relating to the conserved heat amount in the heater core is a temperature of the heater core.

5. An air conditioner for a vehicle according to claim 4, wherein the temperature of the heater core is determined according to a temperature of air flowing into the heater core, a temperature of the hot water and an amount of air flowing into the heater core.

6. An air conditioner for a vehicle according to claim 5, further comprising:
   an inside/outside air switching door for switching air-suction openings between an inside and an outside for air sucked into the air conditioning case, wherein:
   a temperature of the air sucked into the air conditioning case is determined according to an operational position of the inside/outside air switching door, a temperature of the outside air and a temperature of the inside air.

7. An air conditioner for a vehicle having a passenger compartment, comprising:
   a mechanical hot water pump driven by an engine mounted on the vehicle, for circulating hot water in the engine to a hot water circuit;
   a heater core provided in the hot water circuit for heating air blown into the passenger compartment by using the hot water;
   an electric-powered hot water pump for circulating the hot water to the heater core while the engine is stopped; and
   a calculating means for calculating a time period for stopping the electric-powered hot water pump according to information relating to a conserved heat amount in the heater core at a time when the engine is stopped, wherein:
      the electric-powered hot water pump is kept in a non-activation state until the time period has passed after the engine is stopped, and is activated after the time period has passed.

8. An air conditioner for a vehicle according to claim 7, wherein the information relating to the conserved heat amount in the heater core is a temperature of the heater core.

9. An air conditioner for a vehicle according to claim 8, wherein the temperature of the heater core is determined according to a temperature of an air flowing into the heater core, a temperature of the hot water and an amount of the air flowing into the heater core.

10. An air conditioner for a vehicle having a passenger compartment, comprising:
    a mechanical hot water pump driven by an engine mounted on the vehicle, for circulating hot water in the engine to a hot water circuit;
    a heater core provided in the hot water circuit for heating air blown into the passenger compartment by using the hot water;

an electric-powered hot water pump for circulating the hot water to the heater core while the engine is stopped; and a temperature adjusting means for adjusting a temperature of the air blown into the passenger compartment by adjusting a heating amount of the air heated by the heater core, wherein:

the electric-powered hot water pump is in a non-activation state in a situation where an operated position of the temperature adjusting means, after a status of the engine is changed from an activated condition to a non-activated condition, is in a low temperature region as compared to a predetermined value, and an elapsed time after the engine is stopped is within a predetermined time, and wherein:

the electric-powered hot water pump is activated in a situation where the operated position of the temperature adjusting means, after a status of the engine is changed from a activated condition to a non-activated condition, is in a high temperature region as compared to the predetermined value, and the elapsed time after the engine is stopped has passed the predetermined time.

11. An air conditioner for a vehicle according to claim 10, wherein the predetermined value is shifted to a value in a high temperature side as a temperature of air flowing into the heater core becomes high.

12. An air conditioner for a vehicle according to claim 10, wherein the predetermined time is increased as a temperature of air flowing into the heater core becomes high.

13. An air conditioner for a vehicle according to claim 10, wherein the predetermined time is increased as a temperature of the hot water becomes high at a time when the engine is stopped.

14. An air conditioner for a vehicle according to claim 11, wherein the predetermined time is increased as a temperature of air flowing into the heater core becomes high.

15. An air conditioner for a vehicle according to claim 11, further comprising:

an inside/outside air switching door for switching air-suction openings between an inside and an outside for air sucked into the air conditioning case, wherein:

a temperature of the air sucked into the air conditioning case is determined according to an operational position of the inside/outside air switching door, a temperature of the outside air and a temperature of the inside air.

16. An air conditioner for a vehicle according to claim 12, further comprising:

an inside/outside air switching door for switching air-suction openings between an inside and an outside for an air sucked into the air conditioning case, wherein:

a temperature of the air sucked into the air conditioning case is determined according to an operational position of the inside/outside air switching door, a temperature of the outside air and a temperature of the inside air.

17. An air conditioner for a vehicle according to claim 12, wherein the predetermined time is increased as a temperature of the hot water becomes high at a time when the engine is stopped.

* * * * *